(12) United States Patent
Kennedy

(10) Patent No.: US 7,000,331 B2
(45) Date of Patent: Feb. 21, 2006

(54) MEASURING AND TOOL SETTING DEVICE FOR USE ON WOODWORKING MACHINES

(75) Inventor: James Parker Kennedy, Rosmarkie (GB)

(73) Assignee: James P. Kennedy, Rosemarkie (GB)

( * ) Notice: Subject to any disclaimer, the term of this patent is extended or adjusted under 35 U.S.C. 154(b) by 0 days.

(21) Appl. No.: 10/784,780

(22) Filed: Feb. 21, 2004

(65) Prior Publication Data

US 2005/0183281 A1 Aug. 25, 2005

(51) Int. Cl.
*G01B 3/22* (2006.01)

(52) U.S. Cl. .............................. 33/833; 33/836; 33/626
(58) Field of Classification Search .......... 33/832–833, 33/626, 638, 836, 296, 767, 809, 348, 464, 33/613; 144/363, 169, 371–372, 52, 54, 144/124–126, 127.1, 117.2, 216–217, 144.1, 144/195.8
See application file for complete search history.

(56) References Cited

U.S. PATENT DOCUMENTS

| | | | | | |
|---|---|---|---|---|---|
| 2,079,908 A | * | 5/1937 | House | .......................... | 33/767 |
| 2,540,405 A | * | 2/1951 | Ramm | ............................ | 33/11 |
| 2,560,571 A | * | 7/1951 | Hawkins | ...................... | 33/833 |
| 3,128,559 A | * | 4/1964 | Winter | ......................... | 33/544 |
| 3,645,002 A | * | 2/1972 | Hefti | ............................ | 33/628 |
| 3,745,658 A | * | 7/1973 | Raneses | ........................ | 33/121 |
| 3,812,588 A | * | 5/1974 | Bennett | ........................ | 33/767 |
| 3,903,609 A | * | 9/1975 | Brown | ......................... | 33/635 |
| 4,321,752 A | * | 3/1982 | Kaufman | ..................... | 33/512 |
| 4,577,412 A | * | 3/1986 | McKinney | .................... | 33/701 |
| 4,653,191 A | * | 3/1987 | Gasser | ......................... | 33/833 |
| 4,894,920 A | * | 1/1990 | Butler et al. | .............. | 33/203.11 |
| 5,077,909 A | * | 1/1992 | Cranor | ......................... | 33/607 |
| 5,205,046 A | * | 4/1993 | Barnett et al. | ................. | 33/533 |
| 5,235,988 A | * | 8/1993 | Johnson et al. | ............... | 33/836 |
| 5,497,560 A | * | 3/1996 | Pasquerella et al. | ........... | 33/836 |
| 5,957,174 A | * | 9/1999 | Shadeck | ................... | 144/117.1 |
| 6,263,585 B1 | * | 7/2001 | Dickinson et al. | ............. | 33/836 |
| 6,546,634 B1 | * | 4/2003 | Ming | ....................... | 33/27.032 |
| 6,581,502 B1 | * | 6/2003 | Ryan | ............................ | 83/763 |
| 6,662,456 B1 | * | 12/2003 | Triplett | ......................... | 33/203 |

* cited by examiner

Primary Examiner—Christopher W. Fulton
Assistant Examiner—Yaritza Guadalupe

(57) ABSTRACT

This invention relates to a measuring and tool setting device having a bridging cursor body 11 of plastics material, wood, metal or any combination of these with an integral locking cam mechanism 12 these acting upon a steel rule or scale 13 which passes through said body at an angle of 90 degrees to a datum drawn between the feet 14 of the body all of these foregoing in conjunction measuring the projection of a cutting edge from a relevant reference face the measurements being read as indicated on the rule or scale by the bevel 15 situated on the cursor body.

3 Claims, 2 Drawing Sheets

MEASURING AND TOOL SETTING DEVICE FOR USE ON WOODWORKING MACHINES

In most woodworking machines the amount of material removed from a workpiece is determined by the projection of a cutting edge from one or more relevant reference faces.

Despite the fact that almost all machines are provided with an integral setting scale achieving accurate results can be difficult and time consuming. Various combinations of dust, bad light, parallax error and miscalculation often result in repeated adjustment wasting time, and on occasion, valuable material.

The most accurate method of measuring or setting cutter projections is by direct measurement from reference face to cutting edge but this is difficult to achieve on many machines. In particular routers and spindle moulders can be difficult to set because the cutter projects from an aperture much larger than the diameter of the cutter so that the reference face or datum stops short of the cutter and there is no closely adjacent base from which the projection can be measured. The bridging cursor of the device described below permits direct measurement of the projection of the cutting edge from the relevant reference face.

According to the present invention there is provided a measuring and tool setting device comprising a bridging cursor body of plastics material, wood, metal or any combination of these with an integral locking cam mechanism acting on a steel rule or scale which passes through said body at an angle of 90 degrees to a datum formed by a line drawn between two feet which form the base of the device.

Figure 1:
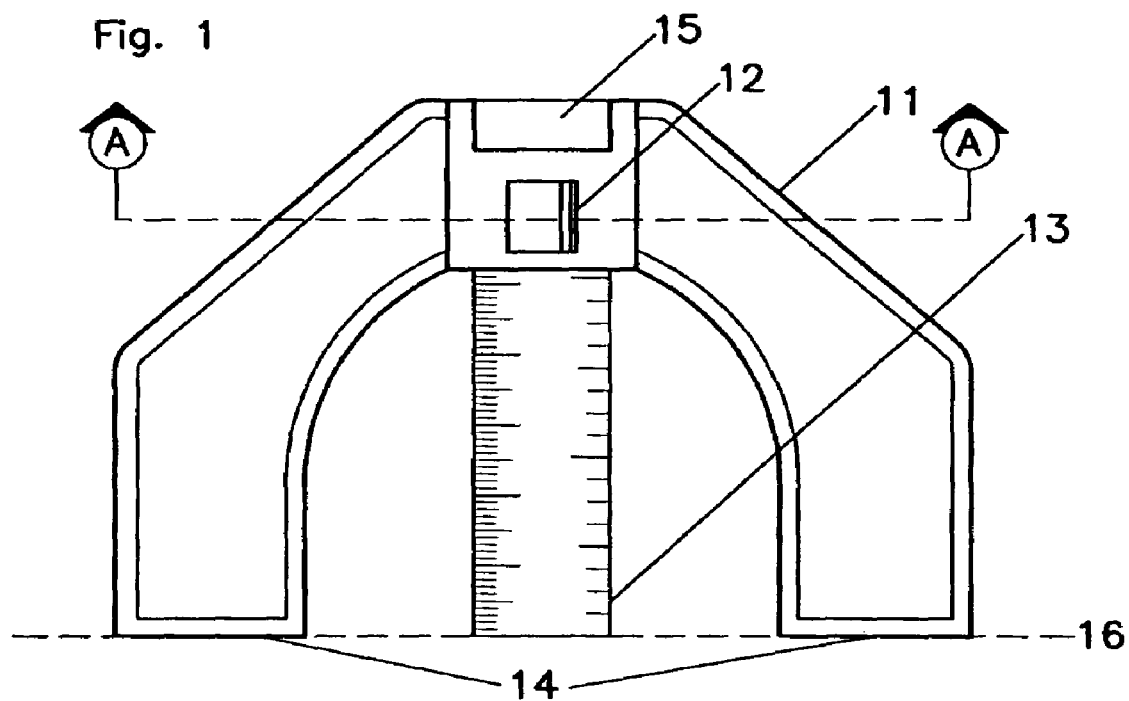

A specification of the device follows having reference to the accompanying drawings which illustrate;

FIG. 1 Front or main elevation of device.

11 Bridging cursor body.

12 Locking cam mechanism.

13 Steel rule or scale shown set to zero.

14 Feet.

15 Bevel, downward inclination of 15 degrees.

16 Datum

Figure 2:
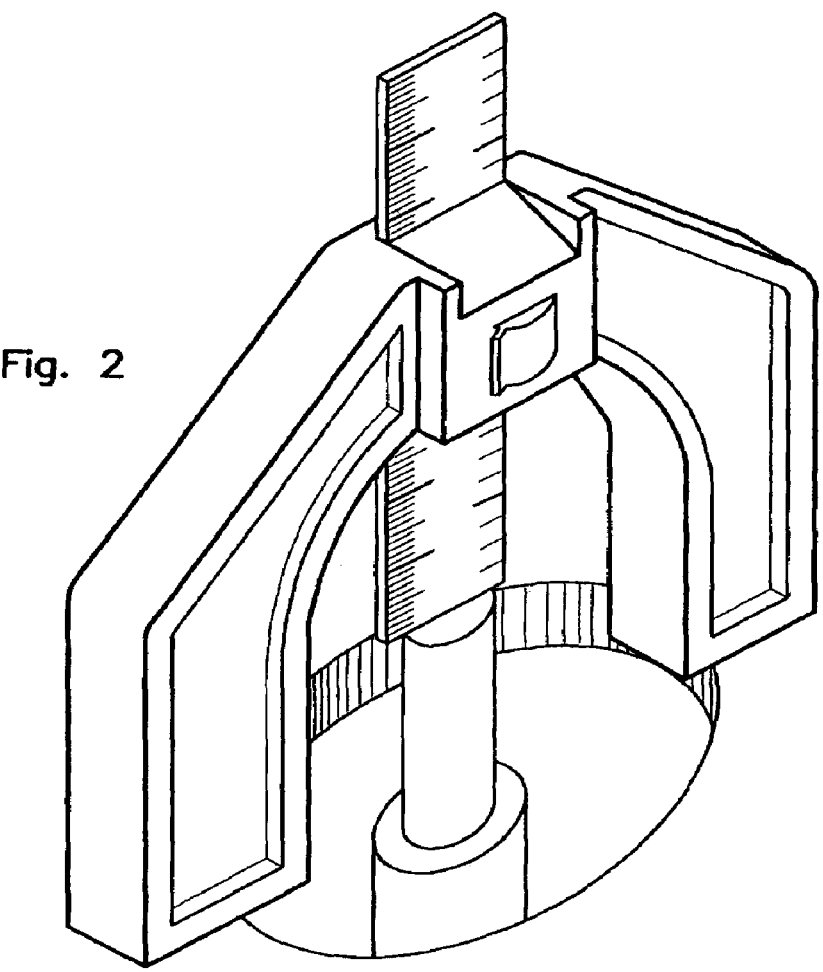

FIG. 2 Cursor body bridging aperture in reference face, measurement of projection of cutter indicated on rule by bevel on cursor body.

Figure 3:
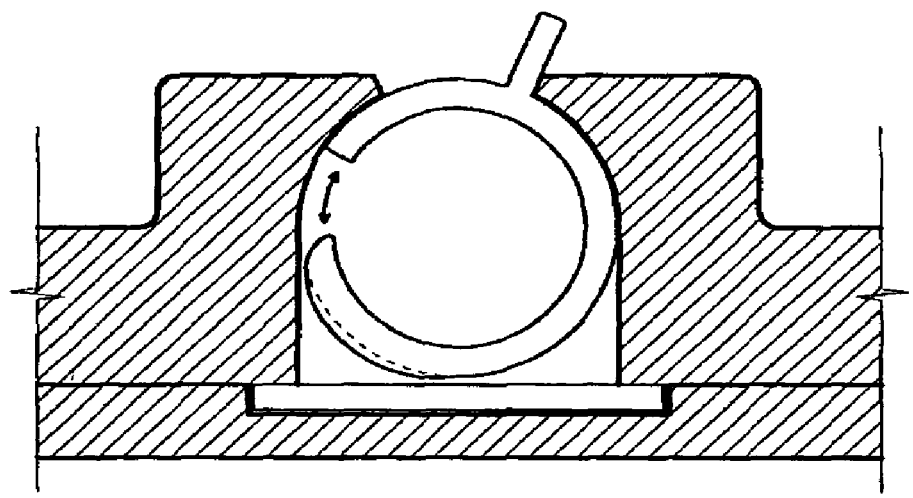

FIG. 3 Section A—A through bridging cursor body, cam free.

Figure 4:
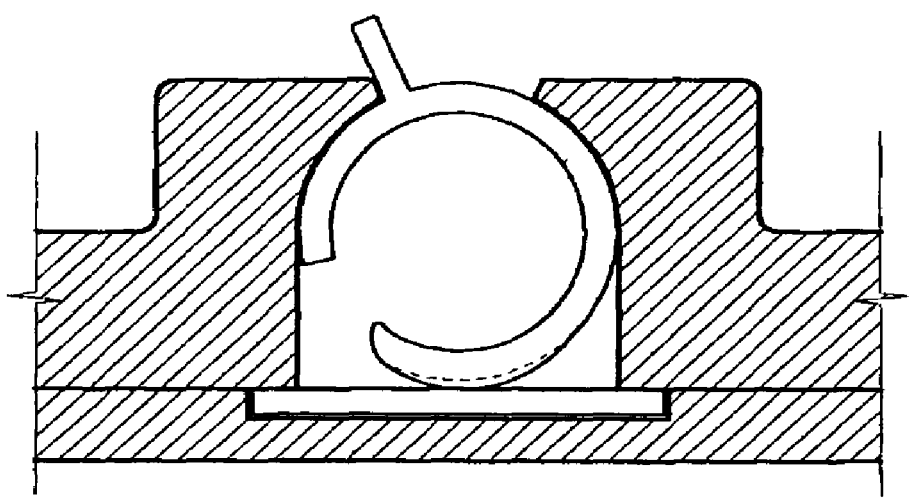

FIG. 4 Section A—A through bridging cursor body, cam engaged.

To measure the projection of a cutter passing through an aperture in a reference face the base of the rule or scale 13 is placed on the cutting edge and the bridging cursor body 11 is passed over the rule so that the feet 14 rest upon the reference face and bridging the aperture. The rule is now displaced relative to the cursor body 11 by the projection of the cutting edge and may be secured by means of the locking cam mechanism 12. The device may now be removed from the reference face and the precise measurement of the cutter projection easily read from the rule as indicated by the bevel 15 on the cursor body. The bevel 15 is a downward slope of 15 degrees.

To set a projection the required measurement is selected on the rule or scale 13 by means of the bevel 15 and the bridging cursor body 11 secured by the locking cam mechanism 12. The feet 14 are set upon the reference face and bridging the aperture and the cutter then brought out to meet the base of the rule or scale 11.

The procedures above may be employed to measure or set the projection of cutters or cutting edges on handheld and bench or table mounted routers, spindle moulders, circular saws, planers, bandsaws and the cursor body employed using varying sizes of rules as a square or to transfer and set sizes in carpentry or cabinetmaking eg on mortises, tenons, or rebates.

What is claimed is:

1. A measuring and tool setting device comprising a one piece bridging cursor body of plastics material, wood, metal or any combination of these containing a releasably locking mechanism in the form of a slotted hollow cylinder acting upon a steel rule or scale passing through the bridging cursor body at an angle of 90 degrees to a datum drawn between two feet which form a base for the device and which when resting upon a reference face will in conjunction with a 15 degree bevel provided at the top or apex of the bridging cursor body and immediately adjacent to the rule or scale indicate a displacement of the rule or scale relative to the datum thereby measuring any projection of a cutting edge from the reference face.

2. A measuring and tool setting device as claimed in claim 1 wherein said releasably locking mechanism in the form of a slotted hollow cylinder includes a projection provided on a surface of the hollow cylinder contacting said rule or scale to impart a frictional force which acts upon the rule or scale and thereby controls the sliding action of the bridging cursor body rule or scale within and relative to the device.

3. A measuring and tool setting device as claimed in claims 1 or 2 wherein the 15 degree bevel provided at the top edge or apex of the bridging cursor body defines a common downward sloped surface housing said relasably locking mechanism within, and having a distal end which permits direct measurement of the rule or scale, and a proximal end downwardly sloped towards a frontal end of the bridging cursor body and above said releasably locking mechanism.

* * * * *